United States Patent
Bergmann

(10) Patent No.: US 9,847,653 B2
(45) Date of Patent: Dec. 19, 2017

(54) BATTERY AND METHOD FOR SAFELY OPERATING THE BATTERY

(71) Applicants: Robert Bosch GmbH, Stuttgart (DE); Samsung SDI Co., Ltd., Yongin-si, Gyeonggi-do (KR)

(72) Inventor: Sven Bergmann, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 1151 days.

(21) Appl. No.: 13/975,455

(22) Filed: Aug. 26, 2013

(65) Prior Publication Data

US 2014/0054960 A1 Feb. 27, 2014

(30) Foreign Application Priority Data

Aug. 27, 2012 (DE) .................. 10 2012 215 186

(51) Int. Cl.
*B60L 1/00* (2006.01)
*H02J 7/00* (2006.01)

(52) U.S. Cl.
CPC .............. *H02J 7/00* (2013.01); *H02J 7/0016* (2013.01); *Y02T 10/7055* (2013.01)

(58) Field of Classification Search
CPC ............ H01F 38/14; H02J 5/005; H02J 7/025
See application file for complete search history.

(56) References Cited

U.S. PATENT DOCUMENTS

| 6,629,050 | B2 * | 9/2003 | Modgil | ................. | B60R 25/04 180/287 |
| 7,852,024 | B2 * | 12/2010 | Sho | ......................... | B60R 1/074 318/286 |
| 9,580,062 | B2 * | 2/2017 | Perkins | ................. | B60W 10/06 |
| 2011/0024716 | A1 | 2/2011 | Bratkovski et al. | | |

* cited by examiner

*Primary Examiner* — Sibin Chen
(74) *Attorney, Agent, or Firm* — Maginot, Moore & Beck LLP

(57) ABSTRACT

A battery includes a plurality of battery cells configured to make available an electrical output voltage and a plurality of battery electronics which is coupled to the plurality of battery cells and includes a current measuring device configured to determine a present battery current, a detection device configured to determine further operating parameters of the plurality of battery cells, and a setting device configured to set an excess current threshold for the battery current based on an actuation variable. The setting device is configured to determine the actuation variable based on a present load bearing capacity of the plurality of battery cells.

4 Claims, 1 Drawing Sheet

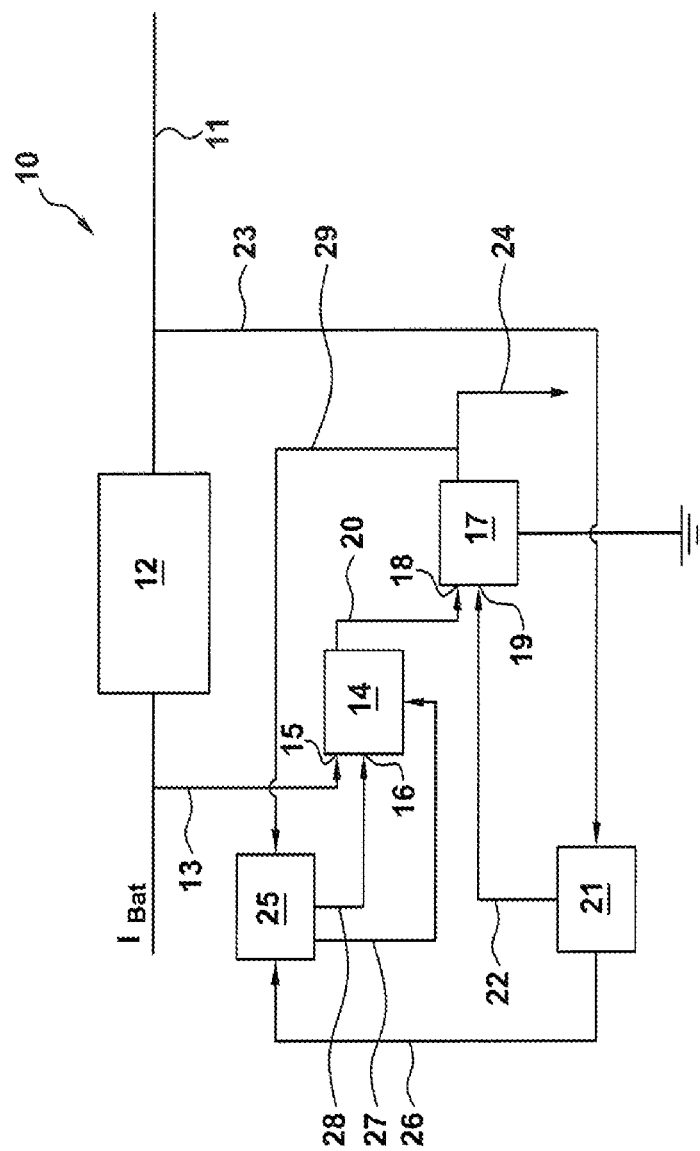

BATTERY AND METHOD FOR SAFELY OPERATING THE BATTERY

This application claims priority under 35 U.S.C. §119 to patent application no. DE 10 2012 215 186.9, filed on Aug. 27, 2012 in Germany, the disclosure of which is incorporated herein by reference in its entirety.

BACKGROUND

The present disclosure relates to a battery having a plurality of battery cells for making available an electrical output voltage and battery electronics which are coupled to the battery cells and which comprise current measuring means for determining a present battery current, detection means for determining further operating parameters of the battery cells, and setting means for setting an excess current threshold for the battery current by means of an actuation variable. In addition, the disclosure relates to a corresponding method for safely operating a battery having a plurality of battery cells, in which method, during the operation of the battery, a present battery current and further operating parameters of the battery cells are determined by means of battery electronics which are coupled to the battery cells, and in which an excess current threshold for the battery current is set by means of an adjustable actuation variable.

It is clear that in the future batteries with a high power density and stringent safety requirements will be used increasingly not in the automotive sector but also in stationary applications and in the consumer sector. Possible batteries for these purposes are, in particular, batteries which are based on lithium-ion technology and which are distinguished not only by a high energy density and power density but also by a low level of self-discharging.

In order to ensure the reliability and a long service life of the batteries, suitable battery monitoring electronics have been developed with which operating parameters of the battery, such as the cell voltage, state of charge, temperature, charge current and/or discharge current are measured and are monitored. In this context, in the case of batteries, in particular the measurement of the battery current, both in the determination of the state of charge and also the measures to ensure safe operation, is considered to be particularly important. This is due, inter alia, to the type of hazards which can give rise to an inadmissible current. For example, an overload of the battery during which more current is made available by the battery than the instantaneous state of the battery permits, taking into account, for example, the present temperature or the state of health of the battery, can lead to dangerous overheating of the battery. An excess current in which more current is made available by the battery than the individual battery cells can supply in accordance with their specification can also lead to resulting dangerous overheating.

A particularly critical point of the monitoring of battery currents is monitoring of the charge current at low temperatures. For example, charging with high currents at very low temperatures can result in the deposition of metallic lithium, which can lead to a considerable malfunction of the battery. The associated monitoring of this so-called "lithium plating" is particularly critical since even a few amperes too many can lead to an undetected fault in the battery.

In order to reliably measure a battery current and in order to allow for the safety classification which is required according to ASIL C (ISO26262) and which arises as a result of the danger and risk analysis mentioned above, particular measures are conventionally taken: accordingly, additional monitoring hardware is often arranged on a current sensor, which hardware is implemented, for example, by means of comparators and which triggers at a certain excess current. Another frequent variant with which multi-channel measurement is ensured is to use two different current sensor systems in one battery, involving the use of, for example, a Hall sensor and a shunt-based sensor at the same time.

US 2011/02416 A1 also specifies a protection device for protecting a load circuit of a battery, in which an excess current threshold is adjusted as a function of the battery voltage.

SUMMARY

According to the disclosure, a battery having a plurality of battery cells for making available an electrical output voltage, and battery electronics which are coupled to the battery cells is made available. Battery electronics comprise current measuring means for determining a present battery current and detection means for determining further operating parameters of the battery cells. In addition, the battery electronics comprise setting means for setting the excess current threshold for the battery current by means of actuation variable. The setting means are designed to determine the actuation variable on the basis of a present load bearing capacity of the battery cells.

In addition, a method for safely operating a battery having a plurality of battery cells is made available, in which method, during the operation of the battery a present battery current and further operating parameters of the battery cells are determined by means of battery electronics which are coupled to the battery cells. In addition, an excess current threshold is set for the battery current by means of an adjustable actuation variable, wherein the activation variation is determined on the basis of a present load bearing capacity of the battery cells.

An advantage of the disclosure is that the battery current can be limited in a particularly reliable way. This is achieved, in particular by virtue of the fact that the actuation variable according to the disclosure is determined on the basis of a present load bearing capacity of the battery cells. As a result, a battery cell characteristic, conditioned, for example, by the type of battery cell, for determining the actuation variable can be taken into account. The reliability and the safety of the battery can therefore be increased.

The setting means preferably have a first microcontroller which is configured to determine the actuation variable on the basis of present measured values of operating parameters of the battery cells.

According to one particularly favorable embodiment of the disclosure, the detection means of the battery have a temperature sensor, a voltage measuring device, a clock generator and/or an electronic timer which supply measured values which can advantageously be added for the present determination of the actuation variable.

According to a further embodiment of the disclosure, the battery has deactivation means which are configured to deactivate the battery if a measured battery current exceeds the set excess current threshold.

The deactivation means preferably comprise a deactivation path and a comparison and activation device for comparing the set excess current threshold with a present battery current measured value, and for activating the deactivation path. This also increases the safety of the battery.

According to yet another embodiment, a test circuit for testing the excess current threshold of the battery is also made available, wherein the test circuit preferably comprises a second microcontroller and/or a second processor core of the first microcontroller and/or a complex programmable logic device (CPLD) for reading out or for calculating the actuation variable.

It is preferred here that the battery also comprises a selection device which can be actuated by means of the test circuit and by means of which the comparison and activation device can be connected on the input side either to an output of the test circuit or to an output of the setting means. Furthermore, an output of the comparison and activation device for transferring a feedback message can be connected to the test circuit.

As a result, a very high level of reliability can be achieved in a particularly effective and comfortable fashion.

The current measuring means according to the disclosure can have a current sensor, in particular a shunt-based current sensor or a Hall sensor. As a result, a high level of flexibility can be achieved.

A particularly favorable development of the disclosure provides that the adjustable actuation variable is configured for a charge load bearing capacity of the battery cells.

As a result, for example in the case of lithium-ion cells, in particular lithium plating can be advantageously avoided.

For the determination of the actuation variable a stored value table which is based on selected values of the possible battery operating parameters can be used. However, a mathematical calculation function is preferably used. The calculation function can be executed, for example, by a microcontroller.

The actuation variable can be processed as a current value or alternatively as a voltage value based on the current value, and this arises, in particular, from the type of current measuring signal used.

In one favorable development of the disclosure there is provision for the actuation variable to be updated in each case after the expiry of a suitable fault tolerance time.

According to one aspect of the disclosure, a motor vehicle, in particular a hybrid vehicle or electric vehicle which has the battery according to the disclosure is also made available, wherein the battery is connected to a drive train of the motor vehicle.

The claimed battery is preferably a lithium-ion battery.

Advantageous developments of the disclosure are specified in the dependent claims and described in the description.

BRIEF DESCRIPTION OF THE DRAWINGS

Embodiments of the disclosure are explained in more detail with respect to the drawing and the following description, in which:

The FIGURE shows a circuit arrangement of a battery according an embodiment of the disclosure which has battery electronics for setting an excess current threshold and for testing the excess current threshold.

DETAILED DESCRIPTION

The FIGURE shows a circuit arrangement 10 of a battery according to an embodiment of the disclosure, which circuit arrangement 10 has battery electronics for setting an excess current threshold and for testing the excess current threshold. The circuit arrangement 10 is presented here in a highly schematic and simplified fashion for the sake of better illustration. The battery has a plurality of battery cells which are not explicitly illustrated in the drawing and which supply and electrical output voltage $U_{out}$ for supplying a load (not illustrated) such as, for example, an electric motor.

According to the disclosure, the battery current is to be measured and monitored, for which purpose current measuring means 12 are used. For this purpose, a battery current $I_{bat}$ is conducted via the current and voltage path 11 shown in the FIGURE, and a corresponding current measuring signal 13, which corresponds to the battery current $I_{bat}$, is generated by means of the current measuring means 12. The current measuring means 12 is implemented in the form of a current sensor, in particular in the form of a shunt-based sensor. In this case, the current measuring signal 13 corresponds to a voltage drop across the shunt sensor 12 is subsequently further processed as an actual voltage $U_{act}$ as a present voltage corresponding to the present battery current $I_{bat}$. However, the disclosure is not restricted to a shunt-based sensor. In other embodiments, the current measuring means comprises, for example, a Hall sensor.

The current measuring means is fed into a first input 15 of a selection device 14 which can be actuated, and is passed on therefrom to a comparison and activation device 17. According to this embodiment, the selection device 14 can be implemented as a switch element with which it is respectively selected whether a signal which is present at the first input 15 or a signal which is present at the input 16 is processed. The second input 16 is used here for test purposes, which is explained more precisely further below. The comparison and activation device 17 also has two inputs 18, 19, wherein the first input 18 is actuated by the selection device 14 with an actuation signal 20. The actuation signal 20 corresponds, for example, to the connected-through current measuring signal 13, which, as has already been explained further above, is present in the form of a shunt voltage value.

The second input 19 with the comparison and activation device 17 is actuated by setting means 21 which, according to the embodiment shown here, has a first microcontroller 21. The setting means 21 or the microcontroller 21 outputs an actuation variable 22 to the comparison and activation device which corresponds to an excess current threshold for the battery current $I_{bat}$. The actuation variable 22 corresponds here to a setpoint voltage $U_{setp}$ which, by means of the comparison and activation device 17, is connected through with the above-mentioned actual voltage $I_{bat}$ corresponding to the battery current $I_{bat}$, as a current measuring signal 13 and actuation signal 20 to the first input 18.

The comparison and activation device 17 compares the actuation signal 20, which is present at the input 18 and which corresponds to the actual voltage $U_{act}$ resulting from the battery current $I_{bat}$, with the actuation variable 22 which corresponds to the setpoint voltage $U_{setp}$ resulting from the present value of the excess current threshold to be set, and in the process said comparison and activation device 17 monitors the compliance with the present excess current threshold or excess current limit.

The actuation variable 22 and therefore the setpoint voltage $U_{setp}$ and the excess current threshold to be set are based, according to this embodiment of the disclosure, on present measured values of operating parameters 23 of the battery cells which are transferred by detection means (not illustrated) to the setting means 21, here the microcontroller 21. The setting means 21 is designed here to determine the actuation variable 22 on the basis of a present load bearing capacity of the battery cells.

It can be considered particularly advantageous here that the setting means 21 determines the actuation variable 22 according to the charge current load bearing capacity of the battery cells. This is advantageous, in particular, if the relevant safety criteria for the charge current and the discharge current are respectively different. For example, in many cases the discharge current plays no role for the safety in terms of the measurement of the current.

The setting means 21 can preferably read out a battery voltage or cell voltage U and a cell temperature T which have been transferred as an operating parameter 23. In addition, a time t is taken into account, in particular for compliance with a fault tolerance time. The fault tolerance time is, for example, a second, depending on the particular application. According to the embodiment in the FIGURE, the following relationship therefore applies to the actuation variable 22:

$$U_{setp} = f(U, T, t)$$

In other words, according to the disclosure a current measuring means 12, here a shunt sensor 12, measures a battery current $I_{bat}$, here a battery charge current, which is communicated to a setting means 21, here a microcontroller. The microcontroller 21 calculates here, as a function of the input variable of the battery voltage U a temperature T of the battery cell and the time t, a maximum permissible charge current which is processed as an excess current threshold. For this purpose, a comparator in the comparison and activation device 17 compares a measured voltage $U_{act}$ across the shunt with a voltage $U_{setp}$ which corresponds to the battery current $I_{bat}$ and which is predefined by the microcontroller 21. If the present battery current $I_{bat}$ is higher than the current which is predefined by the microcontroller 21 or the excess current threshold, a deactivation path 24 is activated.

The deactivation path 24 usually has contactors (not illustrated), with which output terminals the battery can be disconnected on one side or on both sides.

The mathematical function f for the setpoint voltage $U_{setp}$, stored in the setting means 21, is adapted to the respective particular characteristic of the battery cells used. As a result, lithium plating can be reliably prevented in the battery cells. Alternatively, the actuation variable 22 is not calculated but rather instead extracted from a suitable table ("lookup table").

The adaptation of the excess current threshold or of the excess current limit is newly calculated and tested at the end of the fault tolerance time. For this purpose, a second microcontroller 25 is used. The second microcontroller 25 can alternatively also be embodied as a second processor core of the first microcontroller 21 or as a complex programmable logic device. This exporting of the test function to a further autonomous unit, such as the second microcontroller 25, results in a particularly increased level of safety and reliability for the monitoring of the battery current.

According to the embodiment explained here, in order to test the excess current threshold, the actuation variable 22 is transferred to the second microcontroller 25, which is indicated by the arrow 26 in the FIGURE. The microcontroller 25 actuates the selection device 14 by means of a switching signal 27, as a result of which the selection device 14 switches over to the input 16 to which the test signal 28 is now applied. In this context, the setpoint voltage $U_{setp}$ is fed in as the test signal 28. Alternatively, for the test purposes it is also possible to feed in a value which is a little higher or lower than the setpoint voltage $U_{setp}$. The test signal 28 is connected through as an actuation signal 20 to the comparison and activation device 17, the comparator of which should then trigger. As a result, the comparison and activation device 17 then outputs an activation signal which is read back by the second microcontroller 25 as a feedback signal 29, which provides information about the satisfactory functionality of the circuit arrangement 10. After this, the switch in the selection device 14 which can be actuated is switched over again to the input 15, that is to say the input for the "real" current value.

The disclosure can be applied particularly advantageously in sensitive battery cells in which reliable monitoring has to be ensured. In particular, in the case of lithium-ion cells, lithium plating is prevented by virtue of the inventive dynamic adjustability f (U, T, t) of the inventive excess current limit to be monitored. As a result, the disclosure is advantageously distinguished not only with respect to systems with two redundant current measuring systems, with respect to which, in particular, a cost saving and a reduction in the necessary installation space is achieved. An increase in reliability is also achieved compared to systems which merely use a single comparator and in which the power source is not adjustable or with respect to systems in which the cell-typical properties in respect of the battery current load bearing capacity or battery current sensitivity, arising from possibly resulting malfunctions, are not taken into account. Furthermore, the service life can also be increased by virtue of the fact that the monitoring of the battery current can be changed in the inventive way, in particular within one driving cycle, and in that the excess current threshold can be continuously adjusted taking into account current ambient conditions and parameters.

What is claimed is:

1. A battery comprising:
   a plurality of battery cells configured to make available an electrical output voltage; and
   a circuit arrangement operatively connected to the plurality of battery cells for setting and testing an excess current threshold of the plurality of battery cells comprising:
      a current measuring device configured to determine a present battery current of a battery current;
      a detection device configured to determine a plurality of operating parameters of the plurality of battery cells;
      a setting device configured to:
         determine the excess current threshold of the plurality of battery cells based on a present load bearing capacity of the plurality of battery cells that is determined based on the plurality of operating parameters of the plurality of battery cells; and
         generate an actuation variable corresponding to the excess current threshold;
      a deactivation device configured to deactivate the battery if a measured battery current of the battery current exceeds the excess current threshold corresponding to the actuation variable from the setting device, the deactivation device including a deactivation path, and a comparison and activation device configured (i) to compare the actuation variable from the setting device with a present battery current measured value, and (ii) to activate the deactivation path;
      a test circuit configured to test the excess current threshold, the test circuit including at least one of a first microcontroller and a complex programmable logic device configured to read out or calculate the actuation variable, wherein an output of the comparison and activation device is configured to transfer a feedback message and is connected to the test circuit; and
      an evaluation device configured to be actuated by the test circuit and through which the comparison and activation device on an input side is configured to be optionally connected to one of (i) an output of the test circuit, and (ii) an output of the setting device.

2. The battery according to claim 1, wherein the setting device includes a second microcontroller configured to determine the actuation variable based on a plurality of present measured values of the plurality of operating parameters of the plurality of battery cells.

3. The battery according to claim 1, wherein:
the current measuring device includes one of a shunt-based current sensor and a Hall sensor, and
the detection device includes at least one of temperature sensor, a voltage measuring device, a clock generator, and an electronic timer.

4. A motor vehicle, comprising:
a drive train; and
a battery connected to the drive train, the battery including (i) a plurality of battery cells configured to make available an electrical output voltage, and (ii) a circuit arrangement operatively connected to the plurality of battery cells for setting and testing an excess current threshold of the plurality of battery cells comprising:
a current measuring device configured to determine a present battery current of a battery current;
a detection device configured to determine a plurality of operating parameters of the plurality of battery cells;
a setting device configured to:
determine the excess current threshold of the plurality of battery cells based on a present load bearing capacity of the plurality of battery cells that is determined based on the plurality of operating parameters of the plurality of battery cells; and
generate an actuation variable corresponding to the excess current threshold;
a deactivation device configured to deactivate the battery if a measured battery current of the battery current exceeds the excess current threshold corresponding to the actuation variable from the setting device, the deactivation device including a deactivation path, and a comparison and activation device configured (i) to compare the actuation variable from the setting device with a present battery current measured value, and (ii) to activate the deactivation path;
a test circuit configured to test the excess current threshold, the test circuit including at least one of a first microcontroller and a complex programmable logic device configured to read out or calculate the actuation variable, wherein an output of the comparison and activation device is configured to transfer a feedback message and is connected to the test circuit; and
an evaluation device configured to be actuated by the test circuit and through which the comparison and activation device on an input side is configured to be optionally connected to one of (i) an output of the test circuit, and (ii) an output of the setting device.

* * * * *